(12) United States Patent
Figovsky et al.

(10) Patent No.: US 9,051,447 B1
(45) Date of Patent: Jun. 9, 2015

(54) POLYMER CONCRETE COMPOSITION

(71) Applicants: Oleg Figovsky, Haifa (IL); Raisa Potashnikov, Migdal HaEmek (IL); Alex Trossman, Haifa (IL); Irina Yanov, Afula (IL)

(72) Inventors: Oleg Figovsky, Haifa (IL); Raisa Potashnikov, Migdal HaEmek (IL); Alex Trossman, Haifa (IL); Irina Yanov, Afula (IL)

(73) Assignees: MALAXIT, Baku (AZ); POLYMATE, LTD, Haifa (IL)

( * ) Notice: Subject to any disclaimer, the term of this patent is extended or adjusted under 35 U.S.C. 154(b) by 0 days.

(21) Appl. No.: 14/182,409

(22) Filed: Feb. 18, 2014

(51) Int. Cl.
*C08K 3/34* (2006.01)
*C08K 3/26* (2006.01)
*C08L 33/04* (2006.01)

(52) U.S. Cl.
CPC ... *C08K 3/26* (2013.01); *C08K 3/34* (2013.01); *C08K 2003/265* (2013.01)

(58) Field of Classification Search
USPC .................. 524/442, 443, 556, 559
See application file for complete search history.

(56) References Cited

U.S. PATENT DOCUMENTS

| | | |
|---|---|---|
| 4,341,673 A | 7/1982 | Hyde |
| 4,400,413 A | 8/1983 | Emmons et al. |
| 4,874,675 A | 10/1989 | Ceska |
| 5,565,535 A | 10/1996 | Costin et al. |
| 6,034,155 A | 3/2000 | Espeland et al. |

*Primary Examiner* — Vu A Nguyen
(74) *Attorney, Agent, or Firm* — Henry M. Feiereisen, LLC

(57) ABSTRACT

A polymer concrete composition, preferably for decorative and shock resistant building structures and goods includes a binder based of polyfunctional unsaturated compounds, namely acrylated/methacrylated vegetable oil, preferably acrylated/methacrylated soybean oil in an amount of not less than 60 part by weight and at least one acrylatedmethacrylated monomer and/or oligomer in an amount of not more than 40 part by weight, and an aggregate blend. The polymer concrete composition based on acrylated/methacrylated vegetable oil has high wear and shock resistance with low shrinkage and can be used for prefabricated building decorative structures and particularly in civil engineering.

12 Claims, No Drawings

POLYMER CONCRETE COMPOSITION

BACKGROUND OF THE INVENTION

The present invention relates to polymer concrete compositions for use in making decorative and corrosion resistant structures and other structural component elements, such as flooring plates and bath and kitchen elements.

Polymer concrete is a composite material in which the binder consists entirely of a synthetic organic polymer. It is variously known as synthetic resin concrete, plastic resin concrete or simply resin concrete. Polymer concrete is a composite material in which aggregates are bonded together with resins in a polymer matrix. Performance of polymer concrete is strongly dependent on various types and mixed proportion of aggregates and resins. Polymer concrete as highly filled polymer compositions can be prepared on any synthetic binding. However, due to the requirements for density, strength, deformability, chemical resistance, and other characteristics, about 10 different types of monomers or oligomers are used in practice. In combination with modifying additives they are provide more than 30 varieties of polymer concretes. The polymer concretes are distinguished by the nature of the binder; e.g., furan, polyester, epoxy, phenol formaldehyde, carbamide, and so on. A variety of aggregate types have been used in polymer concretes: silicates, gravel, limestone, calcareous rock, granite, clay, quartz, crushed stone, silica sand or calcium carbonate ($CaCO_3$), as well as fine fly ash, phosphor-gypsum, cinder and silica fume. Several silica sands have been used in the foundry industry. Aggregates used must be usually dry and free of dirt to get the best bond between aggregates and resin.

One of the most useful resins using as a binder of polymer concretes are polyester resins. They have a low viscosity, and materials that are based on them have high mechanical and electrical insulating properties and high resistance to acids, gasoline, oils. Because of low cost, the most widely used unsaturated polyester polymer is in the form of 60% to 80% solutions of the prepolymer in copolymerizable monomers such as styrene and a mix of styrene with methyl methacrylate. During hardening, the polyester pre-polymer and the monomer react through their unsaturated groups (double bonds). It should be added that polyester resins are toxic, and with poor stirring of the mixture components the probability of stratification and level-by-level curing of the composition is high. Polyester polymer concrete has high mechanical, cohesion and adhesion strength, and good chemical and freeze-thaw resistance. It has, however, large setting and post-setting shrinkage (up to 10 times greater than Portland cement concrete), which is a serious disadvantage in certain applications.

Polyester polymer concrete is used in various procast and cast-in-place applications in construction works, public and commercial buildings, for the manufacture of sanitary engineering, cladding of composite pipes in bathrooms and toilets, stairs, and chemical-resistant floors. It is disclosed in O. Figovsky, D. Beilin: Advanced Polymer Concretes and Compounds. *Taylor & Francis Group, CRC Press*, 2013, 272 pages—P. 1-4, 7. http://www.taylorandfrancis.com/books/details/9781466590328/.

Patent document RU 2,126,775 describes polymer-concrete composition for facing slabs, which comprises %: unsaturated PN-12 polyester resin, 23-30; cobalt naphtenate, 0.3-0.64; isopropyl benzene hydroperoxide, 0.9-1.5; 0.05-1 mm fraction cinder, 10-17; sand, 55-62; zinc oxide, 0.2-0.9. The composition possesses higher bending strength properties of slabs, higher water resistance and is better natural stone imitation material.

Patent document RU 2,417,178 relates to polymer concrete mixtures and can be used in production of chemical-resistant construction materials and structures. The polymer-concrete mixture contains, wt. %: unsaturated PN-19 polyester resin, 15-19; cyclohexanone peroxide, 0.18-0.23; cobalt naphthenate, 0.36-0.46; quartz filler, 78.96-83.39; and synthetic green pigment, 1.07-1.035. The invention improves physical and mechanical properties and increases chemical resistance of the polymer-concrete mixture in caustic soda solutions.

U.S. Pat. No. 6,034,155, issued of Mar. 7, 2000 to Espeland, et al. discloses a polymer concrete composition preparable by combining components comprising: a resin blend comprising a major amount of at least one rigid unsaturated polyester resin; a minor amount of at least one flexible unsaturated polyester resin; a minor amount of at least one vinyl ester resin; and a minor amount of at least one thermoplastic resin; at least about 10 weight percent, based on the total weight of the composition, of extremely fine filler material having an average particle size of less than about 500 microns; and at least about 20 weight percent, based on the total weight of the composition, of fine filler material having an average particle size of about 500 microns to about 1000 microns. The polymer concrete compositions also include at least one catalyst. Suitable catalysts include conventional free radical polymerization initiators, such as organic peroxides, hydroperoxides, and azo compounds. The polymer concrete compositions also preferably include at least one promoter or accelerator to modify (i.e., increase or decrease) the gel time, cure time, cure rate, and/or cure temperature. The polymer concrete compositions of this invention can also include at least one coupling agent to provide improved adhesion of the resin blend to inorganic surfaces. Typically, the coupling agent increases composite wet and dry tensile strength and modulus, flexural strength and modulus, as well as wet and dry compressive strength. It can also improve the formulation filler wet-out, dispersion, and processability of the materials. Preferably, the coupling agent is a silane coupling agent. Suitable silane coupling agents include amine-functional or epoxy-functional silanes. Examples of silane coupling agents include, but are not limited to, N-(2-aminoethyl)-3-aminopropyl trimethoxysilane, N-(2-aminoethyl)-3-aminopropyl methyldimethoxysilane, (aminoethylaminomethyl)-phenylethyl trimethoxysilane, 4-aminobutyl dimethylmethoxysilane, glycidoxypropyl trimethoxysilane, bis(3-glycidoxypropyl) tetramethyldisiloxane, 3-glycidoxypropyl dimethylethoxysilane, and 3-glycidoxypropyl methyldiethoxysilane. The coupling agent is preferably used in an amount of about 0.1 weight percent to about 1 weight percent, based on the total weight of the resin blend.

Although conventional polyester polymer concretes constitute a great improvement, they still have many disadvantages, such as a big shrinkage, using a lot of toxic crosslink monomers: styrene or/and methylmethacrylate, low shock resistance.

Another binder used most frequently to produce polymer concrete is based on acrylic/methacrylic monomers and/or oligomers.

The most common acrylic/methacrylic polymer concrete is polymethyl methacrylate, which is obtained by polymerization of methyl methacrylate (MMA). The material consists of a highway-grade aggregate and a matrix produced by cross-linking MMA with trimethylol propane trimethacrylate (TMPTMA) or other polyfunctional acrylic oligomers.

Polymer concrete made with this acrylic polymer as a binder is a versatile material, has excellent weathering resistance, good waterproofing properties, good chemical resistance, and relatively low setting shrinkage (0.01 to 0.1%); its coefficient of thermal expansion is equivalent to that of Portland cement concrete (see Table I). Because of its very low tendency to absorb water, acrylic PC has a very high freeze-thaw resistance. The low flash point (11° C.) of the MMA monomer is a disadvantage, however as it constitutes a safety problem.

Although the MMA monomer is more expensive than the prepolymer-monomer used in the more popular polyester polymer concrete, its unique properties account for its use in a great many diverse applications, including the manufacture of stair units, sanitary products, curbstones, and facade plates. The low temperature capability and long-term durability make the material ideal for emergency repairs that must be accomplished when standard concrete repair materials cannot be used. A highly successful development has been its use as a rapidly curing, structural patching material for repairing large holes in bridge decks, spall repairs, emergency full-depth repairs, bridge expansion joints/headers, bearing pads, closure pours and concrete structural beam repairs. The MMA polymer concrete can be applied at any time after the primer has cured which allows for preparation of many areas ahead of time making placement more efficient. It is disclosed in O. Figovsky, D. Beilin: Advanced Polymer Concretes and Compounds. *Taylor & Francis Group, CRC Press*, 2013, 272 pages—P. 6. http://www.taylorandfrancis.com/books/details/9781466590328/.

SU Authors Certificate 1,209,672 discloses a binder for polymer concrete comprising oligoester glycol maleinate, triethylene glycol dimethacrylate, initiator and accelerator. U.S. Pat. No. 4,400,413, issued of Aug. 23, 1983 to Emmons, et al discloses the production of a polymer concrete using dicyclopentenyloxyalkyl acrylate/methacryslate, hydroxyalkyl acrylate/methacrylate and a polymerization catalyst as a binder for an aggregate material, such as sand and crushed stone.

U.S. Pat. No. 4,341,673, issued of Jul. 27, 1982 to Hyde discloses an improved acrylate/methacrylate liquid mixture for use in making an acrylicmethacrylic polymer concrete, wherein the improvement comprises including in the methacrylate liquid mixture 5-12% by weight of liquid mixture of a paraffinic oil and 4-10% by weight of liquid mixture of an acrylic polymer, preferably $C_2$-$C_4$ alkyl methacrylate.

U.S. Pat. No. 4,874,675, issued of Oct. 17, 1989 to Ceska discloses a composition for preparing a polymer concrete, wherein the composition comprises a substantially non-aqueous slurry of (1) an aggregate material (500 part by weight) and (2) a monomer binder system effective to bind the aggregate, upon curing, into a polymer concrete (100 part by weight), the binder system comprising (a) a liquid comonomer component, (b) a solid, thermoplastic macromonomer component dissolved in the comonomer and comprising a linear polymer terminated at one or both ends with a polymerizable end group, and (c) a polymerization catalyst, comprising primary catalyst (initiator), 0.8 part by weight, and co-catalyst (promoter), 0.1 part by weight.

An aggregate is prepared by uniformly mixing crushed stone (½ to ¾ inch maximum size) and sand (rounded grain) in a ratio of 300 parts by weight of stone to 200 parts by weight of sand, and screening out all material passing a No. 50 sieve. According to examples the binder system comprises mainly monoethylenically unsaturated monomers and no more than 5 parts by weight polyfunctional (meth) acrylic monomers (column 10, Table 1).

U.S. Pat. No. 5,565,535, issued of Oct. 15, 1996 to Costin et al. discloses a method for improving the substrate adhesion properties of polymer concrete composition including a substantially non-aqueous slurry of (i) an aggregate component, (ii) a monomer binder component in an amount effective to bind the aggregate component, upon curing, into a polymer concrete, and (iii) a polymerization catalyst. The method involves adding a crosslinking-effective amount of a metal salt of an $\alpha,\beta$-ethylenically unsaturated carboxylic acid to the polymer concrete. Monomer binder component is monofunctional one and selected from the group consisting of dicyclopentenyloxyalkyl methacrylate, dicyclopentenyloxyalkyl acrylate, a hydroxyalkyl methacrylate and mixtures of thereof (column 11, Claim 11; column 11, Claims 12, 13, 16-19).

In all these patents mainly monofunctional acrylates and methacrylates have been used.

SUMMARY OF THE INVENTION

Accordingly it is an object of the present invention to provide polymer concrete which exhibits increased and improved physical properties, especially a reduced shrinkage after cure.

In keeping with this objects and with other which will become apparent hereinafter, one feature of the present invention resides, briefly stated in a curable polymer concrete composition, particularly suitable for articles for building constructions and parts for decoration works, comprising a polyfunctional unsaturated composition as a binder based on a polyfunctional acrylated or methacrylated vegetable oil and at least one of polyfunctional acrylic or methacrylic monomers and/or oligomers, a free-radical curing system including a free-radical initiator and an accelerator, and an aggregate blend including mineral aggregates, sand, and fly ash.

The mineral aggregates of the polymer concrete composition can contain dolomite aggregates 5-20 mm, preferably 5-10 mm.

The compositions in accordance with the present invention is especially suitable for use in making flooring plates, kitchen desks, decorative building panels and bath, toilet and lavatory parts.

The novel features of the present invention will be specified in detail in the appended claims. The invention itself however will be best understood from the following description of the preferred embodiments.

DESCRIPTION OF THE PREFERRED EMBODIMENTS in accordance with the present invention a curable polymer concrete composition is proposed which is particularly suitable for articles of building construction and parts for decoration works.

The proposed polymer concrete composition includes:

a polyfunctional unsaturated composition binder (100 part by weight) including polyfunctional acrylated vegetable oil, or polyfunctional methacrylated vegetable oil, or mixtures thereof in an amount of not less than 60 part by weight and at least one of polyfunctional acrylic monomer, or polyfunctional methacrylic monomer, or polyfunctional acrylic oligomer, or polyfunctional methacrylic oligomer, or mixtures thereof in an amount of not more than 40 part by weight, a free-radical curing system containing a free-radical initiator and an accelerator, and an aggregate blend including mineral aggregates, sand, and fly ash.

The polymer concrete composition according to the invention includes (in weight %) the following:

a mixture of a polyfunctional acrylated vegetable oil, or polyfunctional methacrylated vegetable oil, or mixtures thereof, and at least one of polyfunctional acrylic monomer, or polyfunctional methacrylic monomer, or polyfunctional acrylic oligomer, or polyfunctional methacrylic oligomer, or mixtures thereof from about 8.67% to substantially 9.6%;

a free-radical initiator from about 0.1% to about 0.4%;
an accelerator from about 0.03% to about 0.2%; and
an aggregate blend from about 89.8% to about 91.2% including from about 43.3% to about 86.2% of mineral aggregates, preferably dolomite, from substantially 0 to about 43.3% of sand, and from about 3.2% to about 3.9% of fly ash.

It will be appreciated that other known in the art materials, especially reinforced materials, such as glass, carbon and polypropylene fibers, porous aggregate, pigments, etc. may be additionally used in the polymer concrete composition.

Polyfunctional acrylated and methacrylated vegetable oils are adaptable for use in the present composition. Examples of vegetable oils include soybean oil, linseed oil, perilla oil, dehydrated castor oil, tung oil, coconut oil, corn oil, cottonseed oil, olive oil, palm oil, palm kernel oil, peanut oil, sunflower oil, safflower oil. Combination of oils may be used as well. Soybean oil, linseed oil or their mixtures are preferred. Polyfunctional acrylated and methacrylated vegetable oils are usually produced by reactions between preliminarily synthesized epoxidized oils and acrylic or methacrylated acids. One of possible raw material is vegetable vernonia oil, that contains epoxy groups.

The use of polyfunctional acrylated or methacrylated vegetable oil with functionality more than 2.8 is preferred.

Acrylated soybean oils (CAS #91722-14-4), that can be used in the composition according to the present invention, can be those which are produced by the following companies (see Table 1):

TABLE 1

| Product name | Manufacturer | Functionality | Viscosity, 25° C., Pa · s |
|---|---|---|---|
| EBECRYL bioligomer 5601 | Allnex, Belgium | 3.5 | 26.5 |
| HS9136 | Haisun Tianyi Chemical Engineering Materials Co., Ltd., China | 3 | 15-25 |
| QualiCure GU1800W | Qualipoly Chemical Corporation, Taiwan | 3 | 23-35 |

As polyfunctional acrylic and methacrylic monomers and/or oligomers the following can be used:

dipropylenglycol diacrylate—DPGDA, Alinex;
trimethylolpropane trimethacrylate—EBECRYL 267, Annex; SR350, Sartomer;
triethylene glycol dimethacrylate—SR-205, Sartomer; TGM-3, "Nil Polymers", Russia;
MGF-9—copolymer of methacrylic acid, triethylene glycol and phthalic anhydride, "NII Polymers", Russia
propoxylated (2) neopentylglycol diacrylate—EBECRYL 145, Allnex; SR9003, Sartomer.

Preferably, suitable catalysts are selected from the group consisting of benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide, t-butyl peroctoate, and the like.

Suitable promoters include transition metal salts or complexes such as cobalt naphthanate; and organic bases such as N,N-dimethylaniline (DMA) and N,N-diethylaniline (DEA). Preferably, cobalt naphthanate and DMA are used in combination. Each is preferably used in an amount of about 0.05 weight percent to about 3 weight percent, based on the total weight of the thermoset portion of the resin blend.

Mineral fillers that are used in our composition are conventional one. Aggregates 5-20 mm also dolomite ($NaAl(CO_3)(OH)_2$) from the Francon Quarry in Canada can be used.

Mixing of proposed polymer concrete is carried out by using the continuous mixing machine (Respects Maschinenbau GmbH). The mixing temperature is 60±5° C.

The optimal compositions of the polymer concrete binder are presented in the Table 2.

TABLE 2

Polymer concrete binder (in weight parts)

| Examples (parts by weight) | | | | | |
|---|---|---|---|---|---|
| 5 | 4 | 3 | 2 | 1 | Component of binder |
| 65.6 | — | — | — | 68.0 | Epoxidized Soya Bean Oil Acrylate: GU1800W |
| — | 61.2 | 82.0 | 66.5 | — | EBECRYL bioligomer 5601 |
| — | — | 4.1 | — | — | Polyfuctional acrylates: Dipropyleneglycol Diacrylate |
| 32.8 | 24.5 | — | — | 30.5 | Triethylene glycol dimethacrylate |
| — | 12.2 | — | 30.0 | — | MGF-9 |
| — | — | 8.2 | — | — | Propoxylated (2) neopentyl glycol diacrylate |
| — | 1.5 | — | — | 1.1 | Initiator: Luperox DHD (9,2-Butanone peroxide solution) |
| — | — | 3.7 | — | — | Luperox K2 (Methyl Isobutyl Peroxide) |
| 1.3 | — | — | 2.2 | — | Butanox M-60 (Methyl ethyl ketone peroxide) |
| 0.3 | — | — | 1.3 | 0.4 | Accelerator NL-49P (Cobalt(II) 2-etylhexanoate, 1% Co, in solvent mixture) |
| — | 0.6 | 2.0 | — | — | Accelerator NL-51P (Cobalt(II) 2-ethylhexanoate) |
| 100.0 | 100.0 | 100.0 | 100.0 | 100.0 | Total |

The preferable compositions of proposed polymer concrete is presented in the table 3.

TABLE 3

Polymer concrete composition (% by weight)

| Example | | | | | | | Components of concrete |
|---|---|---|---|---|---|---|---|
| 12 | 11 | 10 | 9 | 8 | 7 | 6 | Binder according to: |
| – | – | – | – | – | – | 8.8 | Example 1 |
| – | – | – | 10.0 | – | 10.0 | – | Example 2 |
| – | – | 10.2 | – | 10.1 | – | – | Example 3 |
| – | 10.1 | – | – | – | – | – | Example 4 |
| 9.7 | – | – | – | – | – | – | Example 5 |
| 3.2 | 4.0 | 3.7 | 3.6 | 3.7 | 3.5 | 3.3 | Fly ash |
| – | – | – | – | – | 22.4 | 22.7 | Sand quarts 0.315-0.63 mm |
| – | – | – | – | – | 20.1 | 19.8 | Sand quarts 0.63-1.25 mm |
| 43.3 | – | – | 43.1 | – | – | – | Sand dolomite 0.315-1.25 mm |
| – | 85.9 | 86.1 | – | – | – | 45.4 | Granite aggregate 5-10 mm |
| 23.8 | – | – | 20.3 | 86.2 | 44.0 | – | Granite aggregate |

TABLE 3-continued

Polymer concrete composition (% by weight)

| Example | | | | | | | Components of concrete |
|---|---|---|---|---|---|---|---|
| 12 | 11 | 10 | 9 | 8 | 7 | 6 | Binder according to: |
| – | – | – | 23.0 | – | – | – | 5-20 mm Dolomite aggregate |
| 20.0 | – | – | – | – | – | – | 5-10 mm Dolomite aggregate 5-20 mm |
| 100.0 | 100.0 | 100.0 | 100.0 | 100.0 | 100.0 | 100.0 | Total |

Properties of the proposed polymer concrete composition are presented in the table 4.

TABLE 4

Properties of polymer concrete

| Example | | | | | | | Properties |
|---|---|---|---|---|---|---|---|
| 12 | 11 | 10 | 9 | 8 | 7 | 6 | |
| 114 | 112 | 110 | 106 | 104 | 106 | 108 | Compression strength, MPa |
| 12.7 | 12.6 | 12.1 | 11.5 | 11.8 | 11.7 | 12.8 | Tension strength, MPa |
| 40.6 | 39.8 | 38.7 | 39.2 | 39.9 | 42.8 | 43.5 | Flexural strength, MPa |
| 0.07 | 0.07 | 0.06 | 0.06 | 0.07 | 0.07 | 0.08 | Shrinkage at hardening, % |
| 0.08 | 0.08 | 0.07 | 0.07 | 0.06 | 0.05 | 0.06 | Water sorption, % |
| 0.13 | 0.13 | 0.12 | 0.13 | 0.14 | 0.12 | 0.14 | Wear resistance, kg/m$^2$ |
| 80 | 80 | 85 | 85 | 80 | 80 | 85 | Heat resistance, according to Martens, °C. |

The present invention is not limited to the details shown since various modification and changes are possible without departing from the spirit of the invention.

What is desired to be protected by Letters Patent is set forth in particular in the appended claims.

What is claimed is:

1. A polymer concrete composition, comprising:
   a polyfunctional unsaturated composition binder (100 part by weight) including at least one first component selected from the group consisting of a polyfunctional acrylated vegetable oil, a polyfunctional methacrylated vegetable oil, and mixtures thereof in an amount of not less than 60 parts by weight, and at least one second component selected from the group consisting of a polyfunctional acrylic monomer, a polyfunctional methacrylic monomer, a polyfunctional acrylic oligomer, a polyfunctional methacrylic oligomer, and mixtures thereof in an amount of not more than 40 parts by weight;
   a free-radical curing system including a free-radical initiator and an accelerator, and
   an aggregate blend including mineral aggregates, sand, and fly ash.

2. The composition of claim 1 wherein the polyfunctional acrylated or methacrylated vegetable oil is an oil selected from the group consisting of acrylated or methacrylated soybean oil, acrylated or methacrylated linseed oil, acrylated or methacrylated palm oil, acrylated or methacrylated castor oil, and mixture of thereof.

3. The composition of claim 1, wherein the polyfunctional acrylated or methacrylated vegetable oil is acrylated or methacrylated soybean oil.

4. The composition of claim 1 wherein the acrylated or methacrylated vegetable oil has a functionality not less than 2.

5. The composition of claim 1 wherein the acrylated or methacrylated vegetable oil has a functionality more than 2.8.

6. The composition of claim 3 wherein the acrylated or methacrylated soybean oil has a functionality not less than 2.

7. The composition of claim 3 wherein the acrylated or methacrylated soybean oil has a functionality more than 2.8.

8. The composition of claim 1, wherein the polyfunctional acrylic monomers or methacrylic monomers and/or oligomers are selected from the group consisting of diacrylate monomers, dimethacrylate monomers, diacrylate oligomers, dimethacrylate oligomers, triacrylate monomers, trimethacrylate monomers and/or oligomers, and mixtures thereof.

9. The composition of claim 1, wherein the mineral sand is selected from the group consisting of quarts, dolomite sand, and mixtures thereof.

10. The composition of claim 1, wherein the mineral aggregate is selected from the group consisting of granite aggregate, dolomite aggregate, and mixtures thereof.

11. The composition of claim 1, comprising in % by weight:
   the at least first component selected from the group consisting of polyfunctional acrylated vegetable oil, polyfunctional methacrylated vegetable oil, and mixtures thereof, and the at least one second component selected from the group consisting of polyfunctional acrylic monomer, polyfunctional methacrylic monomer, polyfunctional acrylic oligomer, polyfunctional methacrylic oligomer, and mixtures thereof from about 8.67% to about 9.6%;
   the free-radical initiator from about 0.1% to about 0.4%;
   the accelerator from about 0.03% to about 0.2%; and
   the aggregate blend from about 89.8% to about 91.2% including from about 43.3% to about 86.2% of mineral aggregate, from about 0% to about 43.3% of sand, and from about 3.2% to about 3.9% of fly ash.

12. The composition of claim 11, wherein the mineral aggregate is dolomite.

* * * * *